Patented Nov. 3, 1931

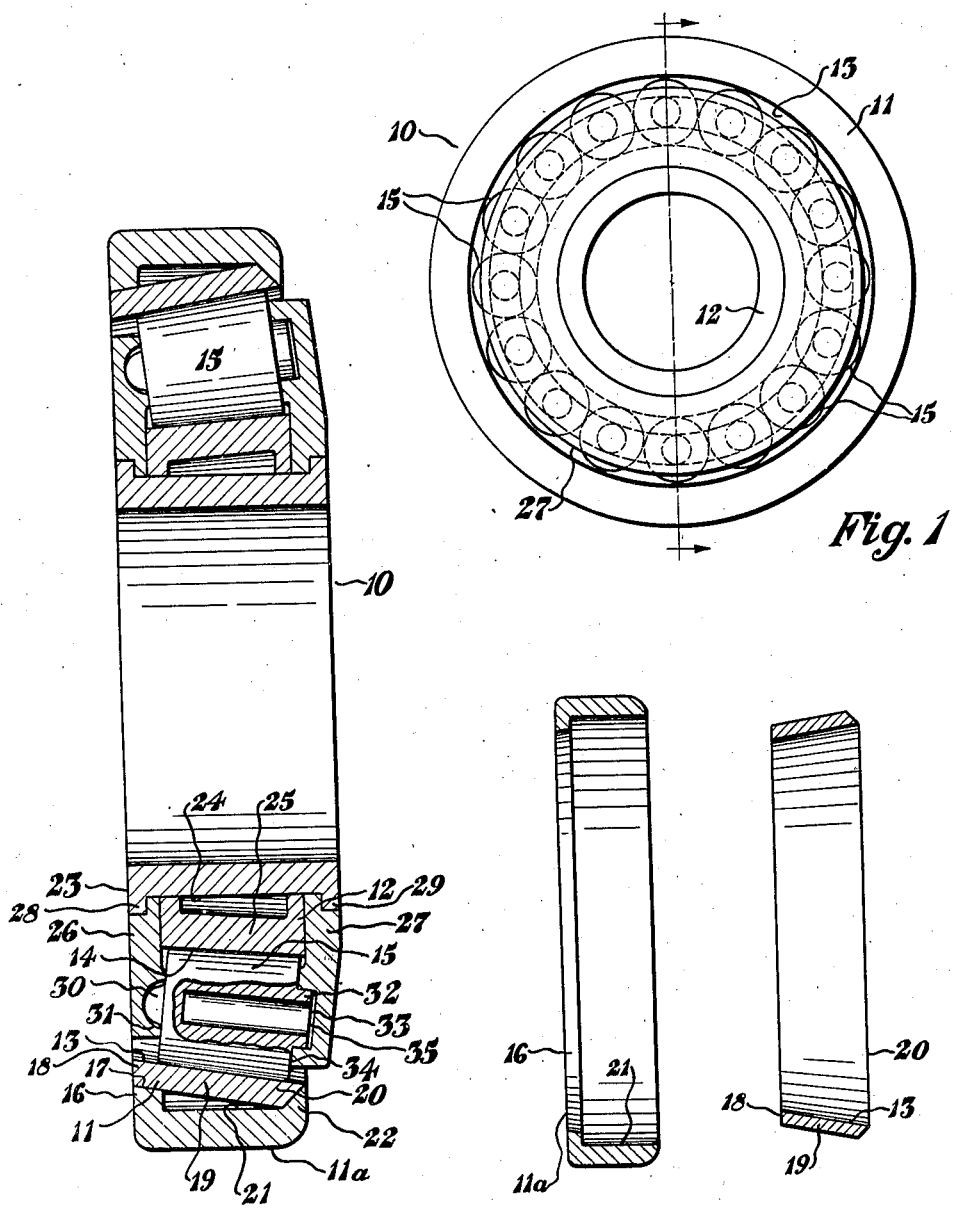

1,830,493

UNITED STATES PATENT OFFICE

FRANK TYSON, OF CANTON, OHIO

ROLLER BEARING MANUFACTURE

Application filed February 18, 1929. Serial No. 340,933.

My invention relates to the manufacture of roller bearings, and includes improvements in the structure and arrangement of roller bearings, and an improved method of making the improved roller bearing structure.

The objects of the improvements include the provision of preferably tapered roller bearings, which are superior in operation and durability to tapered roller bearings at present in use.

The objects of the present improvements also include the provision of an improved method of economically producing the improved roller bearings of the invention.

These and ancillary objects are attained by the present invention, as will hereinafter be set forth in detail, and claimed.

A preferred embodiment of the improved roller bearing hereof, is illustrated in the accompanying drawing forming part hereof, in which Figure 1 is an elevation view of one of the improved roller bearings;

Fig. 2 an enlarged sectional view thereof as on line 2—2, Fig. 1; and

Fig. 3 disassembled sectional views of the component tubular parts of the improved cup for the improved roller bearing.

Similar numerals refer to similar parts throughout the several views.

One embodiment of the improved roller bearing is indicated generally at 10, and includes an improved cup 11, and an improved cone 12, the cup having an inner conical raceway surface 13, and the cone having an outer conical raceway surface 14, and a plurality of conical rollers 15 are arranged to roll between and on the raceway surfaces.

The improved cup 11, includes an outer tubular member 11a, which is made of relatively soft steel, which may be 10–20 carbon steel.

At one end of the cup outer tubular member 11a, an inwardly extending socket flange 16 is formed, the inner surface 17 of which forms a tapered socket for receiving the smaller end 18 of a tapered cup ring 19, the larger end 20 of which rests against the inner surface 21 of the tubular member 11a, and is secured in position by an inwardly extending securing flange 22, which may be spun or rolled over the end 20 of the cup ring from the adjacent end of the tubular member.

The conical raceway surface 13 for the cup is formed by the inner surface of the cup ring 19, and the cup ring 19 is preferably made of case hardened, 10–20 carbon steel.

The foregoing improved construction for the cup, provides a cup having a hardened inner face and a relatively soft outer face, whereby the improved cup has a greater tensile strength than a solid case hardened cup.

Similarly, the improved cone 12, includes a sleeve 23, preferably made of relatively soft, 10–20 carbon steel, upon the inner surface 24 of which is seated a cone ring 25, which is preferably made of case hardened 10–20 carbon steel, and the conical raceway surface 14 is formed by the outer surface of the covering.

Roller retaining rings 26 and 27 abut adjacent ends of the cone ring 25, respectively, and the cone ring and the roller retaining rings are preferably secured in place by flanges 28 and 29 extending outwardly from the sleeve 23, and between which the cone ring is interposed between the roller retaining rings.

The rollers 15 are preferably hollow as illustrated, for attaining resilience and preventing molecular vibrations in the rollers, and are each provided at one end with a preferably dome shaped pintle 30 which extends into an annular groove 31 in the roller retaining ring 26.

At the other end of each roller, a cylindric pintle 32 extends into an annular groove 33 formed in the roller retaining ring 27; and as illustrated, the retaining ring 27 is located adjacent the large ends of the rollers, and is thus the thrust ring for the bearing, and it is preferred that the large end 34 of each roller outside of the outwardly extending cylindric pintle 32 shall abut the adjacent surface of the thrust retaining ring 27, and that a clearance at 35 be provided between the end of the cylindric pintle and the adjacent surface of the groove 33, so that the large end of each roller will have two point contact with the thrust ring.

It is preferred that both of the retaining rings be made of case hardened steel which may be preferably 10–20 carbon steel, otherwise known as machinery steel.

The improved method of making the aforesaid improved roller bearings, comprises the steps of wedge seating a case hardened roller bearing member within a relatively soft member, and preferably flanging the soft member over the hardened member for securing the members together.

I claim:

1. A roller bearing including a cone having an outer raceway surface, a cup having an inner raceway surface, and a plurality of roller members rolling on and between the raceway surfaces, the cup including a ring on which the cup raceway surface is formed, and a seating member for the ring comprising a continuous annulus of relatively soft material, and the ring being made of relatively hard material, and fixed within the seating member.

2. A roller bearing including a cone having an outer raceway surface, a cup having an inner raceway surface, and a plurality of roller members rolling on and between the raceway surfaces, the cone including a ring on which the cone raceway surface is formed, and a seating member for the ring comprising a continuous annulus of relatively soft material, and the ring being made of relatively hard material, and fixed upon the seating member.

3. A roller bearing including a cone having an outer raceway surface, a cup having an inner raceway surface, and a plurality of roller members rolling on and between the raceway surfaces, the cup including a ring on which the cup raceway surface is formed, and a seating member for the ring comprising a continuous annulus of relatively soft material, and the ring being made of case hardened material, and fixed within the seating member.

4. A roller bearing including a cone having an outer raceway surface, a cup having an inner raceway surface, and a plurality of roller members rolling on and between the raceway surfaces, the cone including a ring on which the cone raceway surface is formed, and a seating member for the ring comprising a continuous annulus of relatively soft material, and the ring being made of case hardened material, and fixed upon the seating member.

In testimony that I claim the above, I have hereunto subscribed my name.

FRANK TYSON.